US007439507B2

(12) United States Patent
Deasy et al.

(10) Patent No.: US 7,439,507 B2
(45) Date of Patent: Oct. 21, 2008

(54) APPARATUS AND METHOD FOR THERMAL SIDE DETECTION IN A VEHICLE

(75) Inventors: Kevin M. Deasy, Nobelsville, IN (US);
Ronald M. Taylor, Greentown, IN (US);
Siddharth S. Rege, Kokomo, IN (US);
Adil Ansari, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/609,778

(22) Filed: Dec. 12, 2006

(65) Prior Publication Data

US 2007/0152152 A1  Jul. 5, 2007

Related U.S. Application Data

(60) Provisional application No. 60/754,762, filed on Dec. 29, 2005.

(51) Int. Cl.
*G01J 5/00* (2006.01)
(52) U.S. Cl. .................................. 250/338.1
(58) Field of Classification Search .... 250/338.1–338.5
See application file for complete search history.

(56) References Cited

U.S. PATENT DOCUMENTS

| 5,107,120 | A | * | 4/1992 | Tom | 250/342 |
| 5,166,681 | A | * | 11/1992 | Bottesch et al. | 340/933 |
| 5,463,384 | A | * | 10/1995 | Juds | 340/903 |
| 5,668,539 | A |  | 9/1997 | Patchell |  |
| 6,424,272 | B1 | * | 7/2002 | Gutta et al. | 340/937 |
| 6,753,766 | B2 |  | 6/2004 | Patchell |  |
| 6,961,006 | B2 |  | 11/2005 | Harter, Jr. et al. |  |
| 7,148,482 | B2 | * | 12/2006 | Harter, Jr. | 250/353 |
| 7,253,722 | B2 | * | 8/2007 | Deasy et al. | 340/436 |
| 2005/0211903 | A1 |  | 9/2005 | Harter, Jr. |  |
| 2006/0067378 | A1 | * | 3/2006 | Rege et al. | 374/120 |

OTHER PUBLICATIONS

MLX90601 Datasheet, Melexis Microelectronic Integrated Systems.*

* cited by examiner

*Primary Examiner*—David P. Porta
*Assistant Examiner*—Kiho Kim
(74) *Attorney, Agent, or Firm*—Douglas D. Fekete

(57) ABSTRACT

A detecting device for a vehicle and method thereof is provided. The device includes a first infrared detector, a second infared detector, and a controller. The first infrared detector is configured to repeatedly measure a temperature of a first target area by receiving infrared radiation of the first target area over a sampling period. The second infrared detector is configured to repeatedly measure a temperature of a second target area by receiving infrared radiation of the second target area over the sampling period. The controller is configured to receive and store the plurality of first and second signals, wherein the controller repeatedly compares a plurality of correlation values to a predetermined tolerance range above a minimum threshold value, wherein the correlation values are determined by repeatedly comparing a plurality of time delayed signals of the second plurality of signals to a real time signal of the plurality of first signals.

29 Claims, 12 Drawing Sheets

Blind Spot Detection System with identical coverage areas

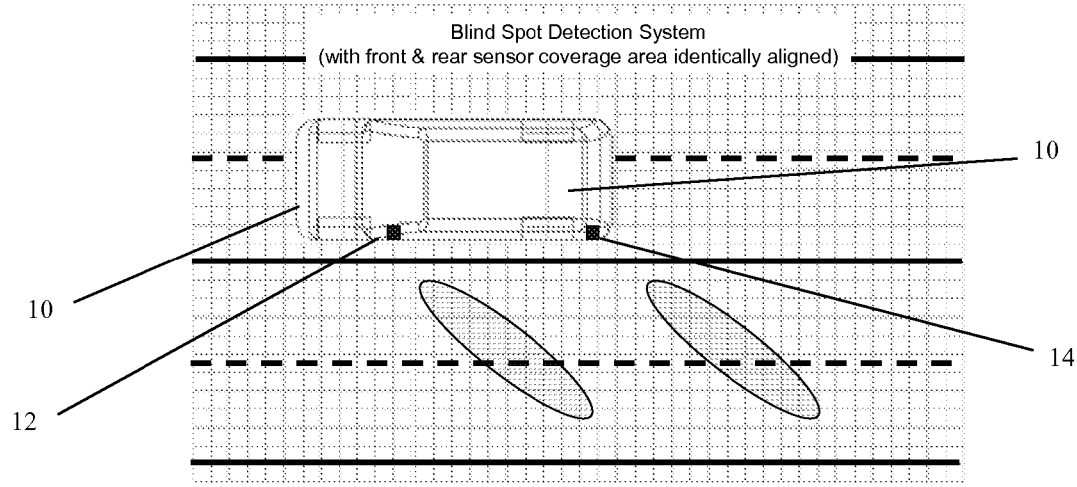
Figure 1. Blind Spot Detection System with identical coverage areas
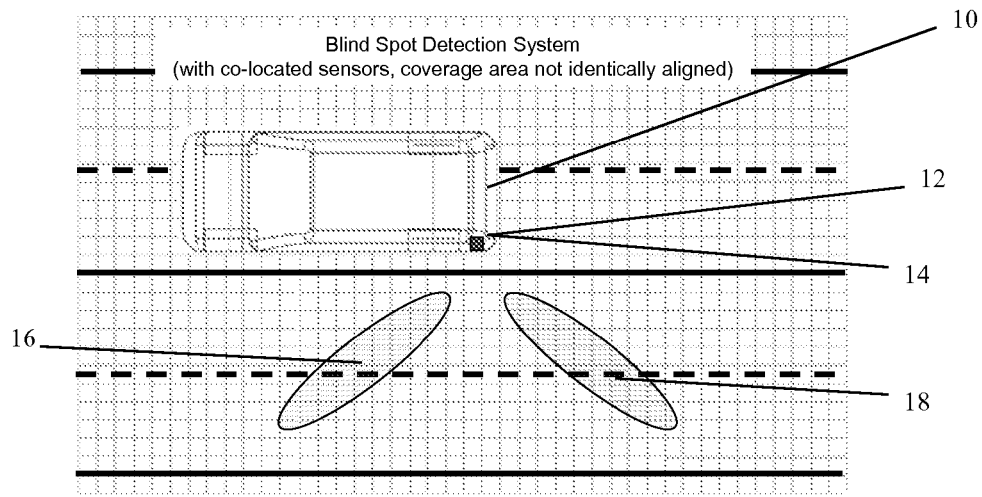
Figure 2. Blind Spot Detection System with non-identical coverage areas

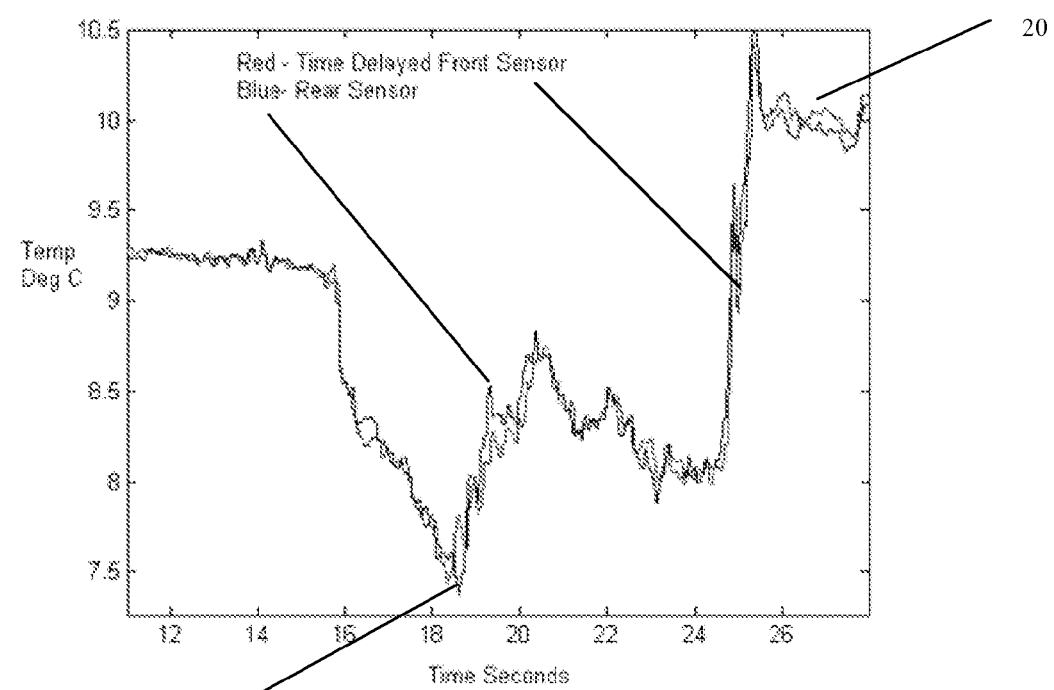
Figure 3. Typical no target (stationary clutter) detection waveform

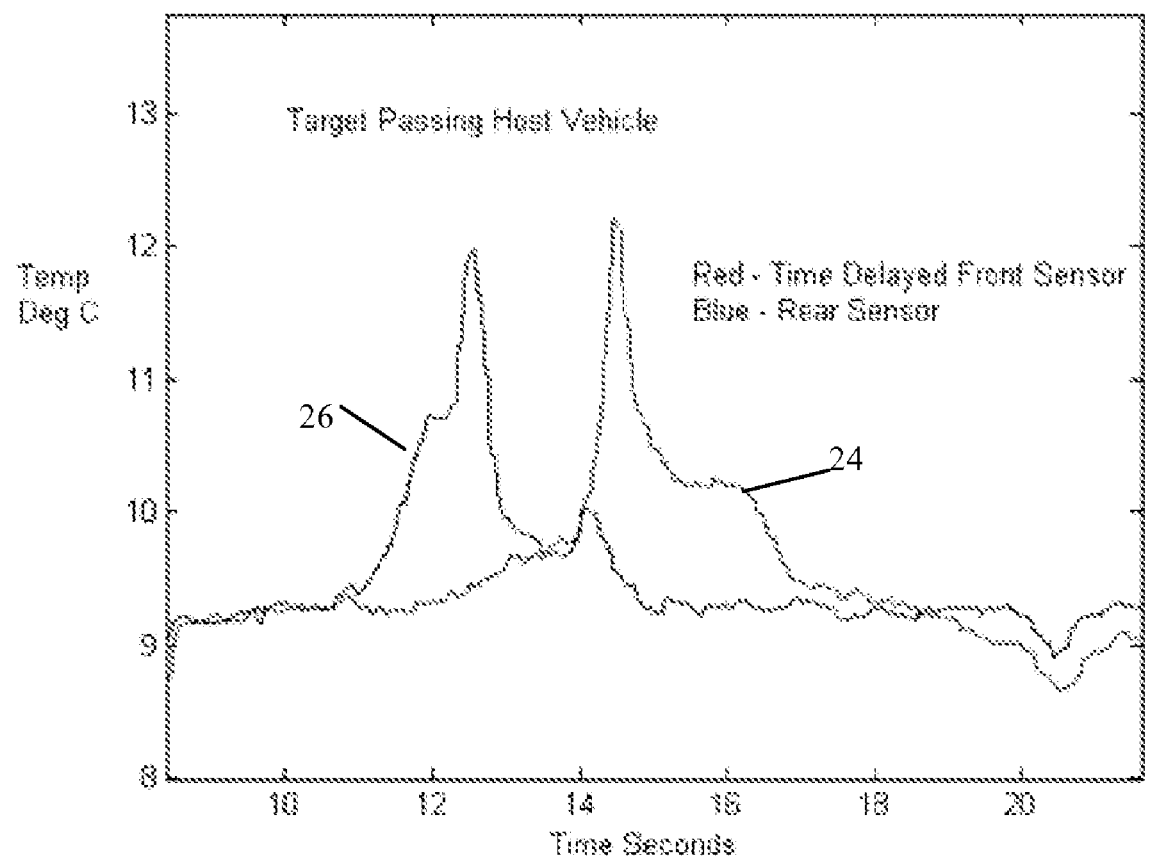
Figure 4. Typical moving target detection waveform

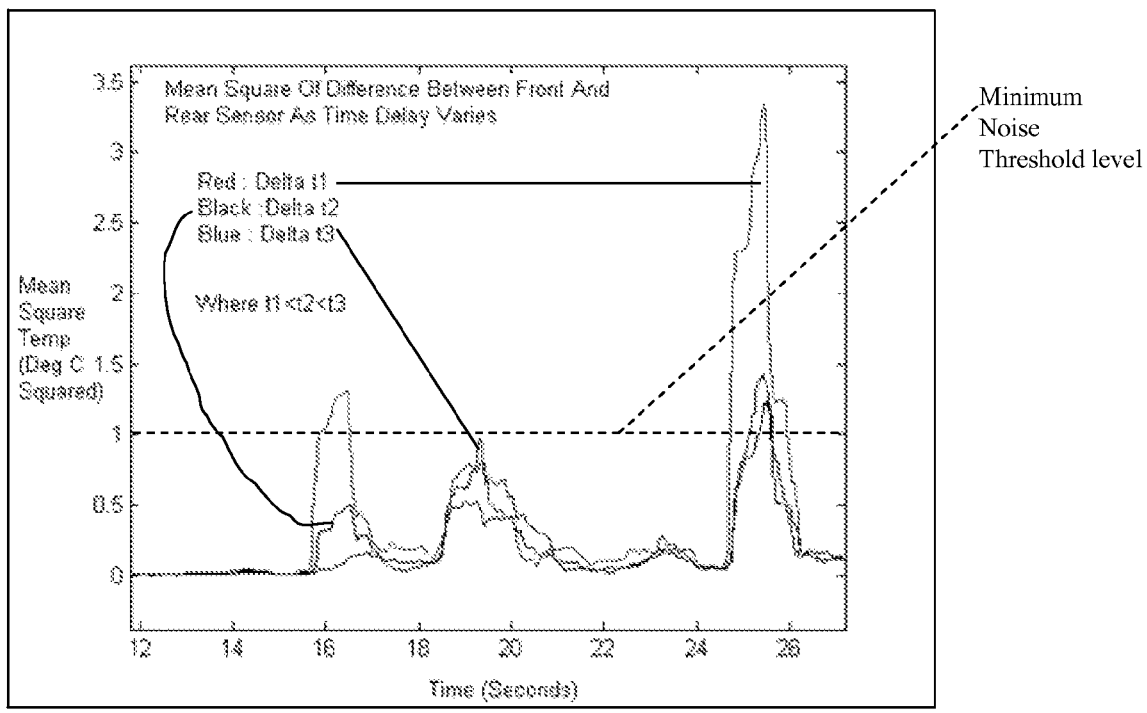
Figure 5. Discrimination of stationary objects (clutter) using this technique

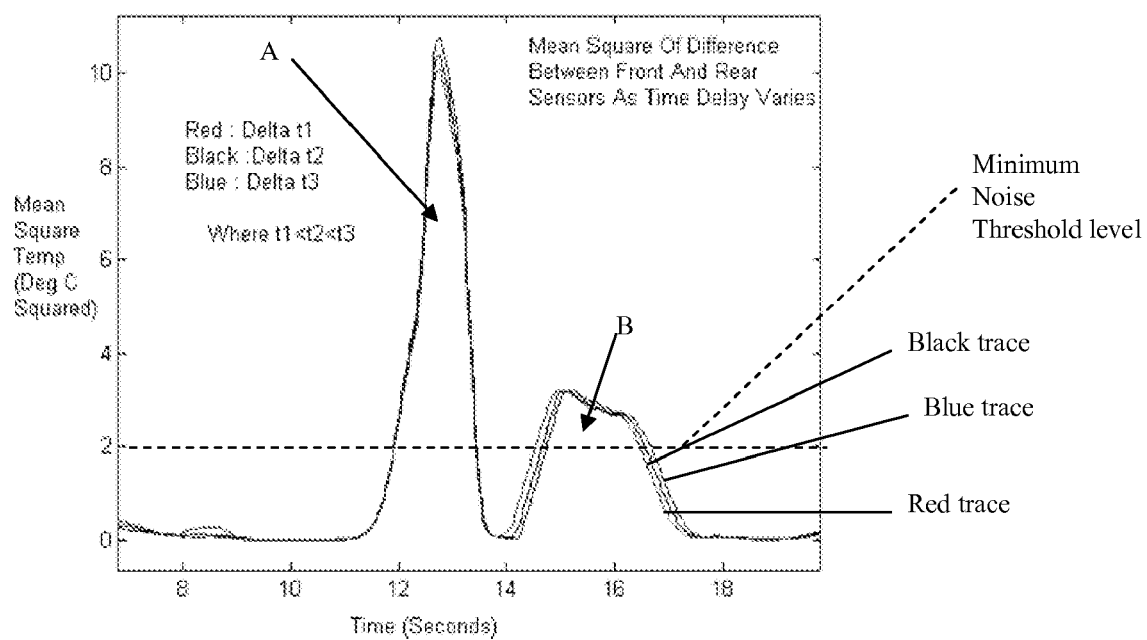
Figure 6. Discrimination of moving objects using this technique

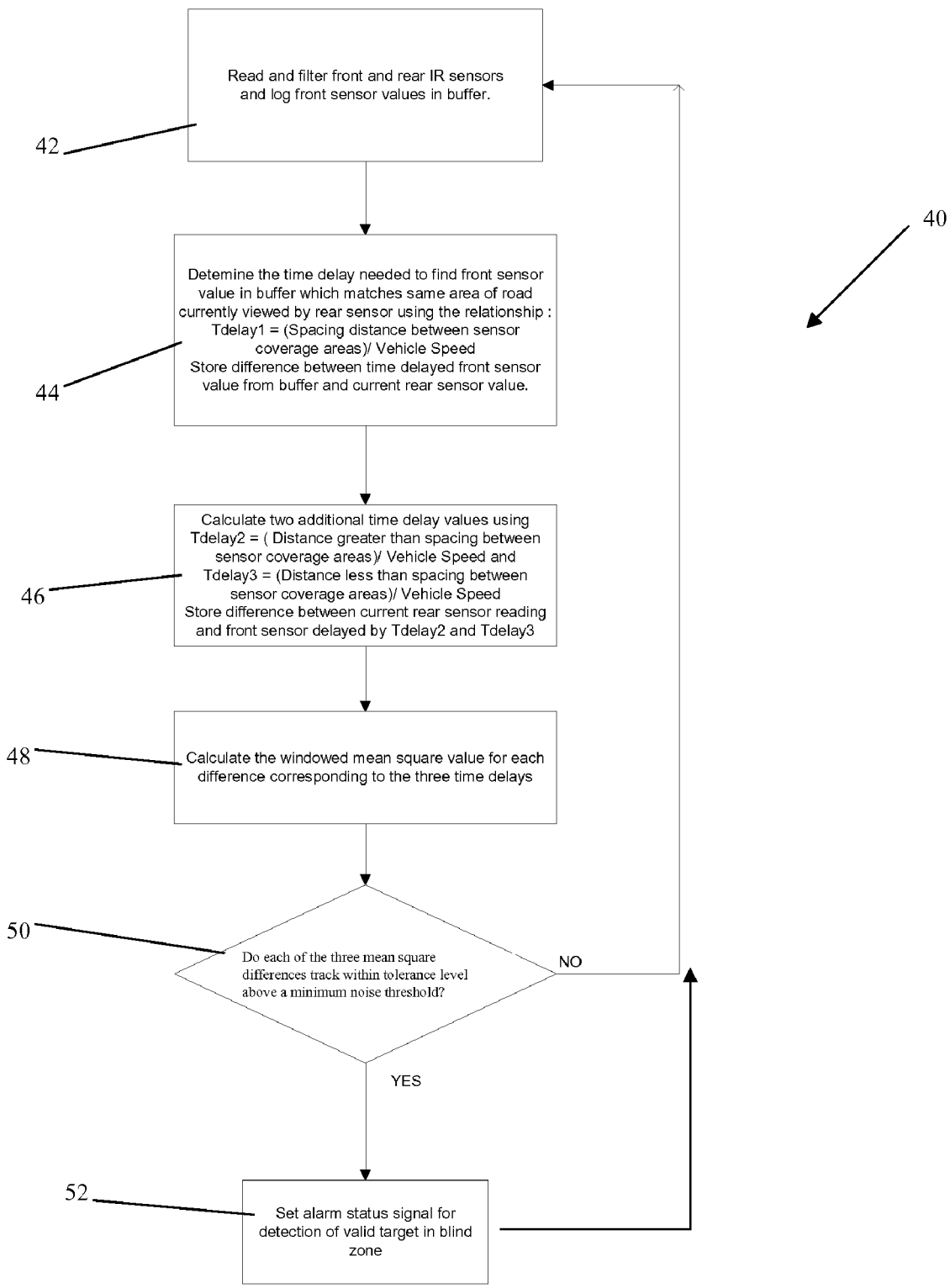
Figure 7. Flowchart of target discrimination technique

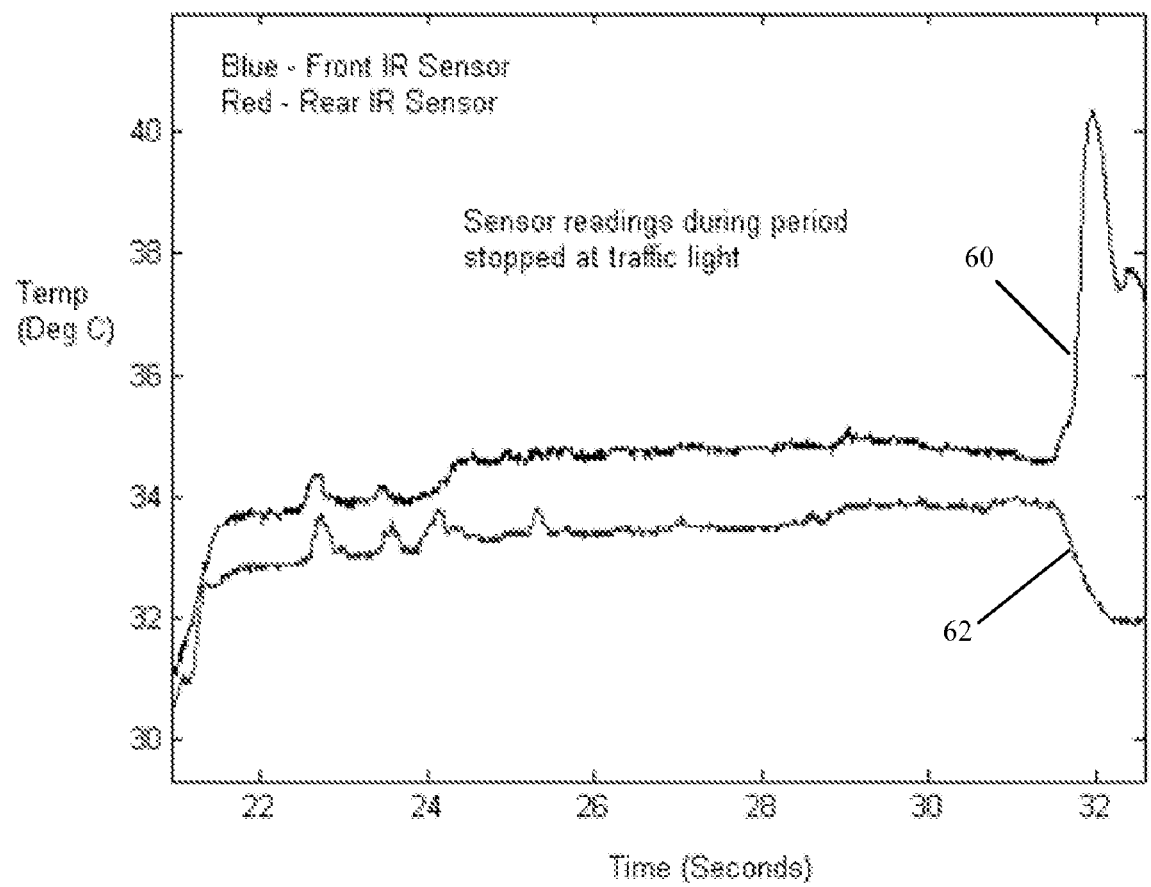
Figure 8. Typical low speed sensor detection waveform signals

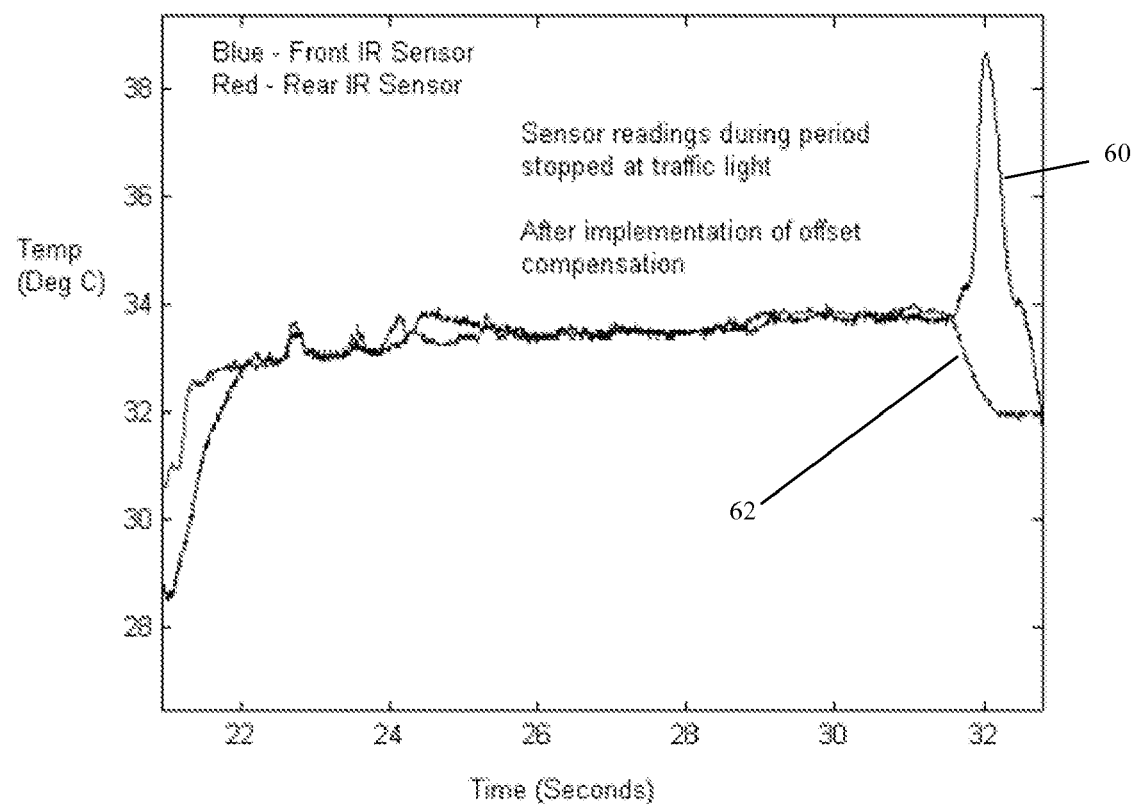
Figure 9. Low speed mode detection waveform (after removing offset)

APPARATUS AND METHOD FOR THERMAL SIDE DETECTION IN A VEHICLE

CROSS REFERENCE TO RELATED APPLICATIONS

The present application claims the benefit of U.S. Provisional Patent application Ser. No. 60/754,762 filed Dec. 29, 2005 the contents of which are incorporated herein by reference thereto.

BACKGROUND

This present invention relates generally to detecting devices more specifically, the present invention relates to an apparatus and method for detecting objects on either side of a vehicle.

Motor vehicle operators are required to negotiate traffic safely when traveling on public roads. For this reason, cars, trucks and other road-traveling motor vehicles are typically equipped with mirrors positioned both inside and outside the vehicle. The mirrors allow the driver to see a portion of the road behind or beside the vehicle with only a slight shift of the eyes or turn of the head. If other vehicles are visible the driver will be suitably alerted and in position to avoid making an inappropriate move, such as a lane change.

Being aware of other vehicles is particularly important when changing lanes, either to the left or the right. To change lanes safely the driver needs to ascertain beforehand that there is no vehicle in the adjacent lane. However, for simple reasons of geometry the mirrors only provide a partial view of the space immediately to the side and towards the back of the vehicle, which needs to be clear to change lanes. Accordingly, an unviewable space of the mirrors is typically checked by the driver who physically turns his or her head to the side so that the space can be viewed directly. When it is confirmed that the space is clear and that there is no other vehicle fast approaching, the driver can move their vehicle into the desired lane.

Backup warning systems are being used today to alert vehicle operators of objects that may be a collision hazard when vehicles are in close proximity. Such warning systems are desirable to minimize or avoid vehicle damage that may otherwise occur. These warning systems are designed to give vehicle operators an audio and/or visual warning (e.g. flashing lights) of an impending or potential collision with sufficient reaction time such that the vehicle operator can respond to the warning and make appropriate countermeasures to prevent the collision.

Accordingly, it is desirable to provide a device that can alert the vehicle operator of an object in close proximity to either side of the vehicle.

SUMMARY

Disclosed herein is a detecting device for a vehicle, the detecting device comprising: a first infrared detector configured to repeatedly measure a temperature of a first target area by receiving infrared radiation of the first target area, the first infrared detector being configured to provide a plurality of first signals each corresponding to a measured temperature of the first target area over a sampling period; a second infrared detector configured to repeatedly measure a temperature of a second target area by receiving infrared radiation of the second target area, the second infrared detector being configured to provide a plurality of second signals each corresponding to a measured temperature of the second target area over the sampling period, the second target area being different from the first target area; and a controller configured to receive and store the plurality of first signals and the plurality of second signals in a storage medium, wherein the controller repeatedly compares a plurality of correlation values to a predetermined tolerance range above a minimum threshold value to determine if an object is moving in either the first target area or the second target area and towards the detecting device, wherein the plurality of correlation values are determined by repeatedly comparing a plurality of time delayed signals of the second plurality of signals to a real time signal of the plurality of first signals.

In another exemplary embodiment, a method for detecting whether an object is approaching a vehicle is provided, the method comprising: sampling a first target area with a first infrared detector configured to repeatedly measure a temperature of the first target area by receiving infrared radiation of the first target area, the first infrared detector being configured to provide a plurality of first signals each corresponding to a measured temperature of the first target area over a sampling period; sampling a second target area with a second infrared detector configured to repeatedly measure a temperature of the second target area by receiving infrared radiation of the second target area, the second infrared detector being configured to provide a plurality of second signals each corresponding to a measured temperature of the second target area over the sampling period, the second target area being different from the first target area; storing the plurality of first signals and the plurality of second signals in a storage medium; determining a plurality of correlation values by repeatedly comparing a plurality of time delayed signals of the second plurality of signals to a real time signal of the plurality of first signals; comparing the plurality of correlation values to a predetermined tolerance range above a minimum threshold value to determine if an object is moving in either the first target area or the second target area and towards the detecting device; and providing a warning signal if a predetermined amount of the correlation values are outside the tolerance level range.

In another exemplary embodiment, a system for detecting whether an object is approaching a vehicle is provided the system comprising: an infrared detection device comprising: a first infrared detector configured to repeatedly measure a temperature of a first target area by receiving infrared radiation of the first target area, the first infrared detector being configured to provide a plurality of first signals each corresponding to a measured temperature of the first target area over a sampling period; and a second infrared detector configured to repeatedly measure a temperature of a second target area by receiving infrared radiation of the second target area, the second infrared detector being configured to provide a plurality of second signals each corresponding to a measured temperature of the second target area over the sampling period, the second target area being different from the first target area, wherein the first infrared detector and the second infrared detector are located in a single housing mounted to the vehicle and wherein the first target area is proximate to a rear portion of the vehicle and the second target area is closer to a forward portion of the vehicle than the first target area; and a controller comprising: a microprocessor and a storage medium, wherein the storage medium and the microprocessor are operably coupled to the first infrared detector and the second infrared detector and the storage medium is configured to receive and store the plurality of first signals and the plurality of second signals, wherein the microprocessor is configured to repeatedly compare a plurality of correlation values to a predetermined tolerance range above a minimum threshold value to determine if an object is moving in either the first target area or the second target area and towards the detecting device, wherein the plurality of correlation values are determined by the microprocessor executing a control algorithm that is configured to repeatedly compare a plurality of time delayed signals of the second plurality of signals to a real time signal of the plurality of first signals.

The above-described and other features of the present disclosure will be appreciated and understood by those skilled in the art from the following detailed description, drawings, and appended claims.

DRAWINGS

FIG. 1 is a schematic view of a vehicle detection system employing a front and rear sensor with identical coverage areas;

FIG. 2 is a schematic view of a vehicle detection system employing a front and rear sensor with non-identical coverage areas;

FIG. 3 is a plot of temperature data of rear and forward sensors of a vehicle detection system as the vehicle passes a stationary object;

FIG. 4 is a plot of temperature data of rear and forward sensors of a vehicle detection system as another vehicle passes the detection system;

FIG. 5 is a plot of a mean square difference between front and rear sensors as time delay varies for a vehicle detection system as the vehicle passes a stationary object;

FIG. 6 is a plot of a mean square difference between front and rear sensors as time delay varies for a vehicle detection system as another vehicle passes the detection system;

FIG. 7 is a flow chart illustrating portions of a control algorithm in accordance with an exemplary embodiment of the present invention;

FIG. 8 is a plot of non-compensated temperature data of rear and forward sensors during a stopped or low speed vehicle condition;

FIG. 9 is a plot of compensated temperature data of rear and forward sensors during a stopped or low speed vehicle condition;

DESCRIPTION OF EXEMPLARY EMBODIMENTS

Figure 2A:
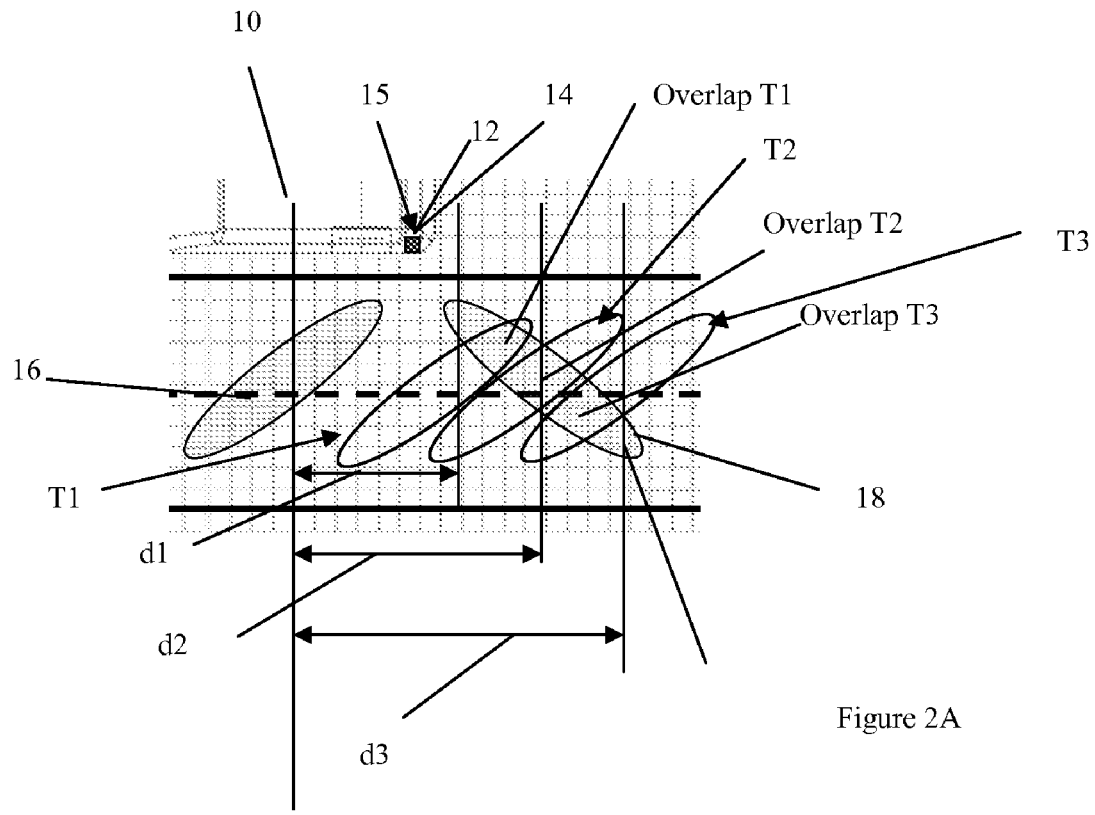
FIG. 2A is a schematic view illustrating coverage areas of a vehicle detection system in accordance with an exemplary embodiment of the present invention.

Disclosed herein is a detecting device more specifically, exemplary embodiments of the present invention relate to an apparatus and method for detecting objects proximate to a side of a vehicle.

An example of such devices are found in the following United States patents: U.S. Pat. Nos. 6,753,766 and 5,668,539 the contents of which are incorporated herein by reference thereto. Also of relevance is U.S. Pat. No. 6,961,006, the contents of which is also incorporated herein by reference thereto. Reference is also made to patent application Ser. No. 10/808,835, filed Mar. 25, 2004, now issued as U.S. Pat. No. 7,148,482, the contents of which are incorporated herein by reference thereto.

In accordance with an exemplary embodiment of the present invention a detection or detecting device is positioned on a vehicle to determine if an object is in a "detection zone". In accordance with an exemplary embodiment of the present invention a device is positioned on either side of the vehicle to provide side detection on either side of the vehicle. In an exemplary embodiment, the device uses reflective optics rather than refractive to measure the temperature of one spot or location with a sensor and then after time delta T wherein the temperature of the same spot is measured again.

Exemplary embodiments of the present invention enables object detection using passive infrared (IR) sensor technology combined with reflective mirror optics. Use of reflective mirrors (especially compared to refractive approaches) offer a superior signal-to-noise relationship, which allows for increased system flexibility. In one non-limiting example, the sensor assembly is constructed using low cost multiple active region IR thermopiles in conjunction with strategically placed mirrors optimized for automotive and commercial truck installations. Reference is also made to commonly owned patent application Ser. No. 11/138,532, now published as U.S. Patent Application Publication No. 2006/0067378A1, Filed May 26, 2005, the contents of which are incorporated herein by reference thereto. Exemplary embodiments of the present invention are not solely limited to automobiles and highway applications for example one other non-limiting application would be obstacle detection for marine vehicles. Furthermore, active emitters or illuminator sources are not required for this invention to function properly. The advantage of the reflective optics of passive IR sensing compared to previous sensing systems is improved detection and performance, which can be easily adapted to predefined detection zones.

As mentioned above warning systems are being used to alert vehicle operators of objects that may be a collision hazard when vehicles are in close proximity. Warning systems are desirable to minimize or avoid vehicle damage that may otherwise occur. Some warning systems are designed to give vehicle operators an audio and/or visual warning (e.g. flashing lights) of an impending or potential collision with sufficient reaction time such that the vehicle operator can respond to the warning and make appropriate countermeasures to prevent the collision.

More specifically, side detection systems using passive infrared sensing techniques are under development for automotive applications to alert drivers of potential hazards due to the presence of unseen vehicles. These detection systems use the output of a multiple sensor module where a front and a rear sensor on either side of the vehicle measure the temperature of a blind spot area environment using the difference in the sensor readings to detect the presence of a target in the blind spot.

The sensors are physically aligned such that while the host driver's vehicle is in motion, the rear sensor coverage area will sweep or cross over the exact same area of road examined by the front sensor at an earlier moment of time. An example of this implementation is illustrated in FIG. 1, wherein a host vehicle 10 is provided with a front sensor 12 and a rear sensor 14. In one exemplary embodiment sensors 12 and 14 are co-located in a single housing 15 (see FIG. 12). The basic idea is to compare the time delayed front sensor signal to the rear sensor signal. A moving target vehicle that is present in the area swept by the rear sensor should result in a temperature difference to the road surface, which has been measured previously by the front sensor before the arrival of the target vehicle. A stationary object should be ignored by the system since the temperature measured by the rear sensor should match the value of the time delayed front sensor enabling the signal to be cancelled out (in a manner similar to the way a differential amplifier cancels common mode noise). It is, of course, understood that sensors may be employed on both sides of the vehicle.

For such a detection system where the front and rear detection areas are identical and the actual temperature values measured from both sensors track or compare to each other to a very high degree of precision, this differential approach works very well to discriminate moving targets and stationary objects. This situation can be further illustrated with a system architecture where the front and rear sensors are mounted separately on the vehicle.

Figure 2B:
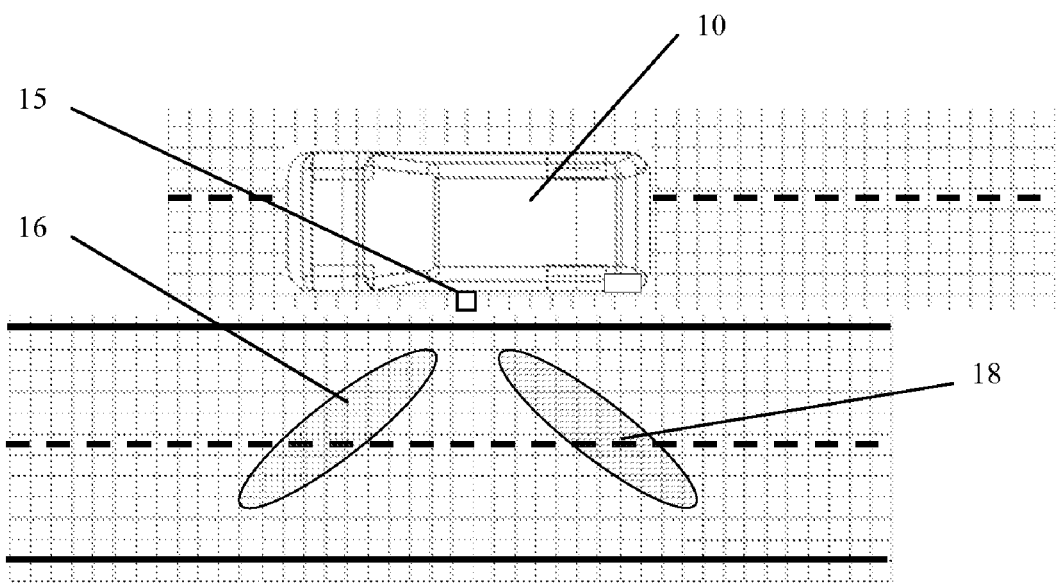
FIG. 2B is a schematic view illustrating an alternative exemplary embodiment of the present invention.

However and referring now to FIG. 2, a system where both sensors are co-located into the same physical enclosure has major advantages in packaging, logistics and product cost that contribute toward a more practical production detection system. Although FIG. 2 shows the sensors located at a rear portion of the vehicle it is understood that the sensors may be located in another location (e.g., more forward) as this is particularly suited for commercial vehicles. One non-limiting example is shown in FIG. 2B. In addition, it is also understood that the target area configurations may vary from those illustrated in the Figures. For example, one area may be larger than the other and/or the areas may both be directed forward or both can be directed rearward or any combination of the aforementioned may be employed.

However and in accordance with an exemplary embodiment of the present invention, a co-located sensor system for sensing a front detection area 16 and a rear detection area 18 or any other detection area 16 and 18 configuration will not create the same coverage areas due to differences in the physical zone geometry caused by the direction and symmetrical nature of the optical design (i.e. there will be a directional shape asymmetry, see FIGS. 1 and 2-2B). In accordance with an exemplary embodiment the co-located sensor arrangement is disposed on both sides of the vehicle. This directional shape asymmetry will minimize the opportunity for an exact object comparison based on the temperature of the coverage areas. This difference has the measurement effect that the temperature signal waveforms do not track or compare with each other identically. This effect does not allow the use of a pure differential output of the time delayed front and the rear sensor values to provide a satisfactory method for reliable discrimination between moving and stationary targets. In accordance with an exemplary embodiment of the present invention, an apparatus and method for addressing the aforementioned limitation of co-located front and rear sensors is provided herein. Accordingly, a technical effect or effects of exemplary embodiments of the present invention are directed to providing a method and apparatus for providing a means for thermal side detection in a vehicle wherein a sensor or detecting device comprising co-located sensors directed to two different discrete areas are positioned on either side of a vehicle. A detailed description of exemplary embodiments of the present invention are presented herein by way of exemplification and not limitation with reference to the attached Figures and supporting description.

As described previously, using a differential output of the time delayed front and the rear sensor is inadequate for target discrimination for co-located sensor detection. In order to distinguish between the signal patterns generated for the case of a moving target versus a stationary object an additional characteristic of the signals is needed. The traditional characteristic that is used is the area of overlap of the two signals, which for a co-located sensor measuring system is distinctly different for each sensor (as shown in FIGS. 2 and 2A). Accordingly, there is minimal overlap in a plot of the responses from a moving target and almost complete overlap for the stationary object response.

This is a consequence of the basic architecture of the system. By way of example, consider that a moving target overtaking the host vehicle is first picked up by the rear sensor while it is behind the host vehicle, at this instant the time-delayed value of the front sensor will not register the target as it did not occupy the same area of road at a specified time delay since it has not yet caught up to the host vehicle. Once the target has begun passing the host far enough to be picked up by the front sensor, the rear sensor will no longer register the same signal as the target has moved beyond the rear coverage area. This means there will always be a time separation between the time-delayed front and rear signals for a moving object.

Now in the case of passing a stationary object since the time delayed front and rear sensor readings correspond at each point in time to the same physical area the signals will generally overlap. This can be demonstrated by examining FIG. 3, which shows a typical waveform generated by passing an area in a highway median strip with an abrupt transition between grass and pavement (clearly a stationary object) wherein a signal 20 of the front sensor is compared to a signal 22 of the rear sensor. The temperature differential created between the two signals should be rejected by a functioning object detection system.

FIG. 4 shows a typical waveform generated by a moving target vehicle passing the host vehicle wherein a signal 24 of the front sensor is compared to a signal 26 of the rear sensor.

Referring again to FIG. 3, while it is clear that the time delayed outputs of the front and the rear sensor are measuring the same general area, the differences in the two signals can also be seen. It can also be seen in FIG. 4 that the return from the passing vehicle seen by the rear sensor is not identical to the return seen by the front sensor. While the signals are not identical due to asymmetries in the system, this does not affect the fundamental difference between the two cases. The discrimination characteristic is due to the differing temporal separation of the front and rear signals thus, there is substantial overlap in the areas of the signals generated by passing a stationary object and little to no overlap in the signal peaks generated by a moving object. Using this insight and in accordance with an exemplary embodiment of the present invention, a process to discriminate more reliably between moving and stationary objects with a co-located sensor array is provided.

In accordance with an exemplary embodiment of the present invention, one way to quantify the area of overlap between the two signals is to calculate the cross correlation function (a standard signal processing method of estimating the degree to which two signals are correlated) which sums the product of the two signals over their extent. This function is generally computed over a range of delays between the two signals however, an exemplary embodiment of the present invention considers that the function would be computed at only one delay value, which would be equal to the time shift used to select the front sensor reading that matches the area now viewed by the rear sensor. The output of this operation could be used to distinguish between a stationary or moving target by determining whether the percentage of overlap area meets a predetermined criterion. The differences in signal area overlap between the cases of stationary and moving objects could also be determined using other signal processing functions and methods (that provide advantages over the cross correlation approach in ease of implementation and computational time requirements).

As explained above, a simple difference between the time shifted front and rear sensor output does not provide a clear discriminate for detection of a moving target however, using the change in the mean square of the difference between the front and rear sensors, as the time shift of the front signal is varied, is one example for providing a means for discriminating. The mean square of the signal difference is used (and not simply the signal difference alone) to provide a necessary smoothing of the noisy difference signal produced by a co-located sensor system. As will be described herein this sampling and filtering will separate the clutter from the moving objects in the detection areas. The mean square of the signal (also known as the signal variance) is used to maximize the assessment of the common overlap between the measurement of the front and rear signals. For a stationary object, this occurs when the front sensor is time shifted such that the delayed front sensor output and the rear sensor output are measuring the same relative portion of the road.

Any time delay shift forward or backwards will decrease the percentage of area of overlap thus changing the variance of the difference. Conversely, for a moving object since there is minimal overlap, applying a variable time shift will have little or minimal effect on the mean square of the signals difference. For example and referring now to the graph of FIG. 5, a mean square of difference between the front and rear sensors of stationary objects is illustrated by three plots Delta t1, Delta t2 and Delta t3 wherein t1 is less than t2 and t2 is less than t3.

In contrast, and referring now to the graph of FIG. 6, a mean square of difference between the front and rear sensors of moving objects is illustrated by three plots Delta t1, Delta t2 and Delta t3 wherein t1 is less than t2 and t2 is less than t3. It is noted that values of t1, t2 and t3 were the same when compiling the data for the graphs. Accordingly and in accordance with an exemplary embodiment, a key discrimination criterion for setting an alarm for a moving target is based on the inspection of the measurement of the mean square difference outputs within a pre-determined variation.

In other words FIG. 5 shows three lines each of which is time shifted from the other wherein differences in the temperature readings indicate an object in the detection zone however, and since the object is stationary there is considerable fluctuation between the readings. On the other hand and referring to FIG. 6, each trace is closer together and the temperature fluctuations are more smoothly aligned thus indicating the presence of a moving object traveling along with or overtaking the vehicle. Accordingly, and since these fluctuation are less volatile they can be used to distinguish between a moving target and "clutter" (e.g., stationary objects or other items being passed by the vehicle).

In accordance with an exemplary embodiment of the present invention, an implementation of the varying time delays is based on varying the value used for the effective space or distance between the sensor coverage areas. As illustrated in FIG. 2A, three time shifted target areas are shown as T1, T2 and T3 each of which has an area of overlap Overlap T1, Overlap T2 and Overlap T3, the differences between each of the three conditions difference d1, difference d2 and difference d3 is calculated over a predetermined time period and wherein multiple differences are stored wherein each difference d1 is relative to time shifted target area T1 and 18 and each difference d2 is relative to time shifted target area T2 and 18 and each difference d3 is relative to time shifted target area T3 and 18 for a predetermined time period.

Thereafter, a plurality of differences corresponding to each difference (differences d1, differences d2 and differences d3) are stored in a buffer or storage medium and then the mean square difference or correlation value for each of the plurality of the associated differences (e.g., differences d1 over a period of time, differences d2 over a period of time, differences d3 over a period of time) is calculated to provide a single data point for each of the differences wherein this data point and other similarly achieved data points are used for moving object detection in the side detection device. In other words each of these single data points is used to generate the lines of FIG. 6. In summary, a target area is sampled by one sensor over a time period and the readings of this sensor is repeatedly compared to three time shifted readings of the other sensor, which has already sampled the target area, wherein the differences are stored and a plurality of differences corresponding to each comparison (e.g., differences d1, differences d2 and differences d3) is computed to provide a correlation value or mean square value which will comprise a data point of one of the three lines illustrated in FIG. 6.

In accordance with an exemplary embodiment of the present invention, one way to quantify the area of overlap between the two signals is to calculate the cross correlation function (a standard signal processing method of estimating the degree to which two signals are correlated) which sums the product of the two signals over their extent. Another non-limiting method for quantifying this area of overlap for detection purposes is to calculate the mean square difference or mean square error between the current rear target area and the three time shifted front area samples.

For example and in a non-limiting embodiment, 4-12 readings of one sensor are compared to three time delayed readings of the other to create a plurality of differences for each of the three time delays and then these differences are used to provide a single correlation value. In accordance with an exemplary embodiment, these calculations occur ever few to tens of milli-seconds. It is, of course, understood that readings greater or less than the aforementioned ranges are considered to be within the scope of exemplary embodiments of the present invention.

In accordance with exemplary embodiments of the present invention and although examples show three time shifted front sensor readings being compared to a current rear sensor reading it is understood that exemplary embodiments of the present invention contemplate numerous sampling readings for comparison (e.g., greater than or less than three time shifted areas as well as greater than one rear area).

Also, exemplary embodiments of the present invention are also directed to a front detection system wherein the current sensor reading is the front sensor and the time shifted readings are the rear sensor as this is applicable for use in detection of a moving object being overtaken by the host vehicle.

Referring now to FIG. 7 portions of a control algorithm 40 for implementing an exemplary embodiment of the present invention is illustrated. At box 42 the algorithm will read and filter the front and rear IR sensors and log front sensor values in a buffer. In accordance with an exemplary embodiment, the buffer is a wrap around buffer wherein and during operation the signals are continuously sampled until the buffer becomes filled and then new data overwrites older data. Thereafter, and at box 44 the algorithm will determine the time delay needed to find the front sensor value in the buffer which matches the same area of road currently viewed by the rear sensor using the relationship: Tdelay=(spacing distance between coverage areas)/Vehicle speed.

As illustrated in FIG. 2A and in accordance with an exemplary embodiment the distance d1 is the distance between the center of the coverage area of area 16 and area 18. In accordance with an exemplary embodiment of the present invention these detection areas are three dimensional and circular in nature thus FIGS. 2A-2B depicts the ground coverage as an ellipse since the detector is angled towards the surface the vehicle is traveling on and the true center of the coverage areas is above the ground. Of course, other non-circular target areas are contemplated to be within the scope of exemplary embodiments of the present invention. It should be noted that vehicle speed is taken from the vehicle's current engine control system or equivalent on board speed measuring device in order to provide a usable speed signal. Once calculated, the difference between the time delayed front sensor value (from the buffer) and the current rear sensor value is stored.

Thereafter, and at box 46 two additional time delays are calculated (Tdelay2 and Tdelay3) wherein the difference between the current rear sensor reading and the front sensor delayed by Tdelay2 and Tdelay3 is stored into memory. See also FIG. 2A. As used above:

Tdelay2=(distance greater than spacing between sensor coverage areas)/vehicle speed, and Tdelay3=(distance less than spacing between sensor coverage areas)/vehicle speed.

At step 48, a correlation value or the windowed mean square difference is calculated for a plurality of differences corresponding to each of the three time delays after a predetermined period of time wherein multiple readings are taken a data point for each of the three time delays is calculated. For example, every few milliseconds three time delayed readings of one sensor are compared to a current reading of the other sensor and then stored, then the process is repeated again. Once a suitable database is achieved a correlation value or mean square difference of the differences corresponding to each time delay comparison are computed to provide three separate data points.

A non-limiting example of the formula for calculating the mean square difference is provided below:

$$\frac{\sum (X - \overline{X})^2}{n}, \text{ where } \overline{X} = \frac{\sum X}{n} \text{ and}$$

X=difference between front and rear sensor temperature values for a given sample n=number of samples Thereafter, and at decision node 50 the algorithm will determine if the three mean square differences track within predetermined tolerance levels above a minimum noise threshold (illustrated by the dashed line in FIGS. 5 and 6). In other words, these data points are compared to each other and if they track within a predetermined range, which is also above the minimum noise threshold then the sensors are not reading clutter or stationary objects and a moving object is in the area being sampled by the two sensors. If, so this means that the detected object is not clutter and a warning signal is to be set. If so, and at step 52 a warning signal is generated. If on the other hand the three mean square differences do not track within predetermined tolerance levels (e.g., no object detected or stationary object being passed by vehicle or signal quantified as clutter) the steps 42-50 are repeated. On the other hand if the alarm or warning signal is provided steps 42-50 are repeated.

As illustrated, FIG. 6 shows areas A and B, wherein the three traces track within the predetermined tolerance range and are above the minimum threshold value, which is illustrated as 2 degrees Celsius. Of course the minimum threshold value may be above and below the aforementioned temperature as the same is merely an illustrative example. FIG. 5 on the other hand illustrates some readings above the minimum threshold value but not within the predetermined tolerance range.

In accordance with an exemplary embodiment as the host vehicle passes a stopped object the sensors will be reading one area at a time while a smaller signal difference is found if the object is moving along the side of the vehicle. Thus, the tolerance level is provided as a means to distinguish between moving objects in the detection zone and clutter.

Accordingly, the time window over which the mean square difference is calculated can be variable to optimize the performance of the system over the full speed range of the host vehicle.

Since the signal measured from different vehicles can vary in amplitude significantly, the use of the percentage of areas of signal overlap comparison is inherently scale invariant and provides for a robust discrimination characteristic. This or other computation techniques that rely on quantifying the degree of signal area overlap is noted as a requirement for implementing exemplary embodiments of the present invention. The calculation of this characteristic creates a powerful mechanism to differentiate the background clutter from the moving objects for a co-located sensor detection system.

Figure 10:
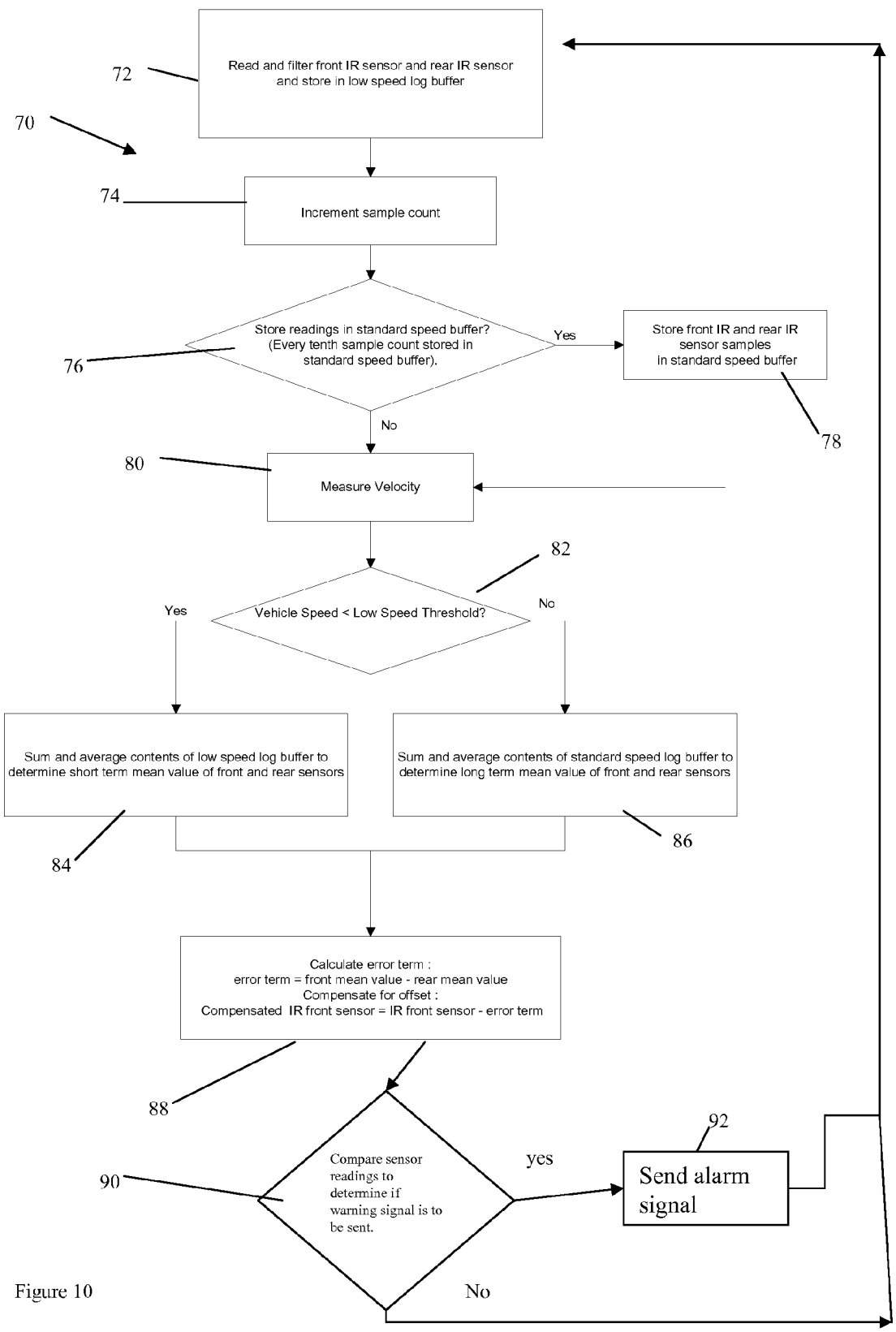
FIG. 10 is a flow chart illustrating portions of a control algorithm in accordance with an alternative exemplary embodiment of the present invention.

Referring now to FIGS. 8-10 an alternative exemplary embodiment of the present invention is illustrated. As discussed above and when the host vehicle is in motion, the rear sensor moves forward to sweep and scan an area that was previously scanned by the front sensor. However, there are situations when it would be desirable to warn when the host vehicle is overtaking a target vehicle at very low host vehicle speeds. It is also desirable for the system to not give a warning when a target vehicle is beside the host vehicle when stopped (e.g., to not deliver a nuisance warning when two vehicles are besides each other at for example, a stop light). These conditions can obviously occur during normal stop and go traffic conditions or when driving in relatively heavy traffic on divided and interstate highways.

Accordingly, and in order to provide such outputs, the system will require the addition of a low speed mode which can also operate to a stationary host vehicle speed condition to accompany the standard infrared blind zone detection system operation to maintain consistent performance regardless of the host vehicle speed.

In accordance with an exemplary embodiment and in order to implement a slower and/or static mode that enables low speed system operation, a method is provided to reject or compensate for stationary objects while the host vehicle itself is stationary. As explained above, for the existing system, host vehicle motion is required in order to identify stationary objects.

Accordingly, the addition of an offset compensation routine (which is a process that will reject constant temperature differences), between the front and rear sensor can accomplish this task. This is because for a stopped vehicle along side a stationary object, whether it is another vehicle or a temperature differential caused by a shadow, the front sensor and rear sensor differential will not change substantially with time.

Non-limiting examples are if the front sensor is imaged onto a sunlit area of road while the rear sensor is pointing at a shaded area of road or if the front sensor is measuring the front bumper of a vehicle along side the host vehicle while the rear sensor picks up the warmer vehicle exhaust. In both cases, even though there will be an offset difference between the sensor values read, the differences will remain relatively constant.

Taking advantage of this sensing characteristic, a routine can be implemented to add a compensation term to one of the sensor outputs to force the constant difference or offset to zero. As in the above example, once the target vehicle alongside the host vehicle begins to move (or if there is a relative movement between the vehicles), the difference between the sensor outputs will no longer be a constant value. At this point, the difference output will become non-zero and enable the normal detection process.

In accordance with an exemplary embodiment, this technique is demonstrated by comparison of the graphs of FIGS. 8 and 9, which show sensor readings before and after offset compensation.

Referring now to FIG. 8, the host vehicle is stopped at a traffic signal in the right hand lane with a row of cars stopped across in the left hand lane. The reading of the front IR sensor is shown by the plot of line 60 while the reading of the rear IR sensor is shown by the plot of line 62. After the host vehicle has come to a complete stop (which happens shortly after the 24-second point as shown in FIG. 8), the temperature difference is fairly constant but with a sufficient magnitude to trigger an alarm if passed to non-compensating infrared blind zone detection system target discrimination logic.

As seen in FIG. 9, after compensation, the front and rear signal difference is now negligible until the 32-second point. At this point, the traffic light has changed allowing the first target vehicle in the left hand lane to begin moving and to pass the host vehicle. The offset compensation system now indicates that the front sensor is measuring a larger differential temperature signal for passing target vehicles than that which triggers a normal infrared blind zone detection system alarm indication.

In summary, the enhanced infrared blind zone detection system in a low speed and/or static mode sets an alarm condition on moving objects passing the host vehicle and ignores stationary objects alongside the host vehicle consistent with the preferred operation of the infrared blind zone detection system.

For practical implementation, several other technical issues need to be addressed. The offset compensation technique is also needed during normal operation while the host is at highway cruising speed where certain road conditions can give rise to a constant error between the front and rear sensors. The system would need to adjust the response rate of the offset compensation routine as a function of speed as a faster response would be desired in static mode to compensate or remove the difference signal from a stationary object. A slower response rate would be used for normal operation as the environmental conditions producing a constant error between the sensors change more gradually.

This additional consideration can be implemented (along with the basic offset compensation technique) as seen in the flowchart of FIG. 10. As illustrated, a higher sample rate of the infrared blind zone detection system sensor readings is used to calculate the mean when a quicker response is required (as in the case for the low speed mode) and a lower sample rate is used when only gradual changes need to be tracked as in the standard operational mode.

There also must be a consideration of the limitations on the various speed sensors used in host vehicles. Vehicle speed sensors which are not of the type known as active sensors have some minimum vehicle speed at which time the signal drop out (i.e. goes to zero) as well as a minimum vehicle speed occurs before a vehicle speed signal is indicated (approximately 0 to 3 kph). Therefore, any speed below these minimum threshold values need to be treated as a stopped condition. Also at low host vehicle speeds, even above the drop out point, the percentage error in the measured velocity is typically higher than at normal highway speeds (e.g. 10% error).

Similar to the case with the offset compensation parameters which would need to change as the vehicle approaches a stopped condition, other system parameters, (e.g. the number of samples used to calculate the output value used for target discrimination), would also be modified as a function of speed.

Figure 11:
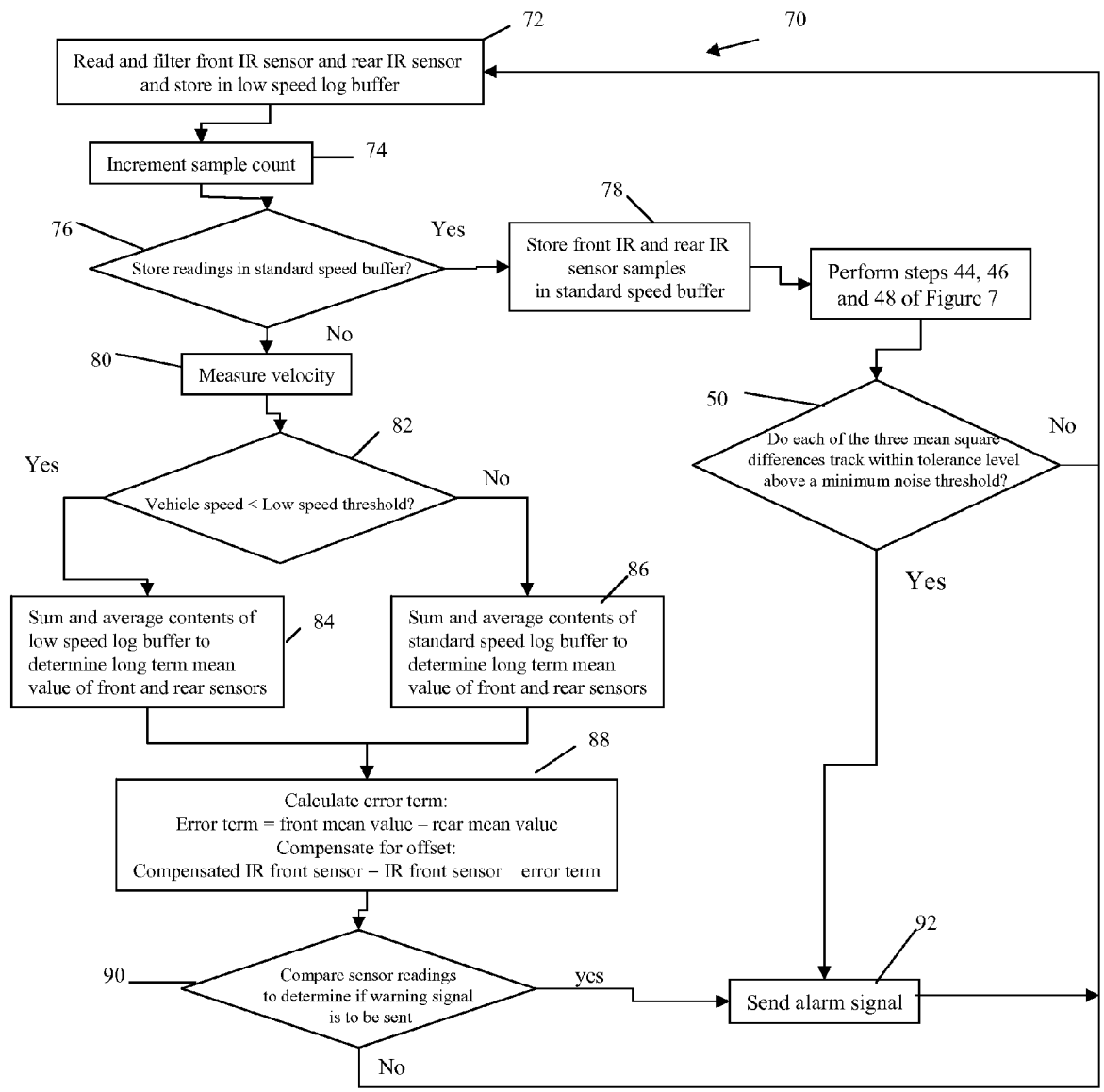
FIG. 11 is a flow chart illustrating portions of a control algorithm in accordance with another alternative exemplary embodiment of the present invention.

Referring now to FIG. 10 portions of a control algorithm 70 for implementing an exemplary embodiment of the present invention is illustrated. At box 72 the algorithm will read and filter the front and rear IR sensors and store the values in a low speed profile buffer. In accordance with an exemplary embodiment, algorithm 70 can be combined with algorithm 40 in order to provide one sensing system wherein the low speed detection mode is a sub-process of the target discrimination algorithm corresponding to the embodiment of FIGS. 2-7. One non-limiting example is provided in FIG. 11.

Alternatively, algorithms 40 and 70 are separately provided. In the combined system, box 72 is combined with box 42.

Thereafter, and at box 74 the algorithm will increment the sample count of the front and rear IR sensors. At decision node 76, the algorithm will determine if the readings are to be stored in the standard speed buffer (e.g., a non-limiting example would be to store every tenth sample count into the standard speed buffer). If so, the front and rear IR sensor readings are stored in the standard speed buffer (box 78). If not, (e.g., non-tenth count) the vehicle speed or velocity is measured (box 80).

At decision node 82, the algorithm will determine if the vehicle speed is below a predetermined value (e.g., a low speed threshold). If so, the algorithm will sum and average the contents of the low speed buffer log to determine the short term mean value of the front and rear IR sensor readings (box 84), wherein the aforementioned techniques are used (e.g., a reading of one sensor is compared to time delayed readings of another sensor over a period of time). If not, the algorithm will sum and average the contents of the standard speed buffer log to determine the short term mean value of the front and rear IR sensor readings (box 86), wherein the aforementioned techniques are used (e.g., a reading of one sensor is compared to time delayed readings of another sensor over a period of time).

Thereafter, and at box 88 the algorithm will calculate the error term and compensate for offset, wherein the error term= (front mean sensor value−rear mean sensor value). The compensated offset is determined as follows: IR front sensor=(IR rear sensor−error term).

Thereafter, and at decision node 90 the algorithm will compare the sensor readings to determine if a warning signal is to be sent (box 92 or in a combined system box 50) during the low speed detection mode. If not, steps 72-90 are repeated. Once the alarm or warning signal is provided steps 72-90 are repeated.

Accordingly, the time window over which the mean square difference is calculated can be variable to optimize the performance of the system over the full speed range of the host vehicle.

The addition of a low speed static detection mode with the correct logic for transitioning between the normal mode with the host vehicle in motion can significantly enhance an infrared blind zone detection system. The use of different sampling rates for offset compensation and transition logic are necessary for implementing exemplary embodiments of the present invention.

Exemplary embodiments of the present invention are directed to a detection system for automotive or other applications. The system is based on measuring the temperature of objects. The system operation is described herein based on exemplary and alternative exemplary hardware configurations. One non-limiting configuration utilizes two separate IR detectors, each with its own parabolic mirror assembly. Another alternative non-limiting configuration utilizes a single multiple active area sensor with a single compound mirror assembly. Each of these configurations includes additional control electronics and a user interface (either contained within or as a separate package).

In accordance with an exemplary embodiment, the algorithm is implemented through a computer or equivalent device operating in response to a computer program. In order to perform the prescribed functions and desired processing, as well as the computations therefore, the computer may include, but is not limited to, a processor(s), computer(s), memory, storage, register(s), timing, interrupt(s), communication interfaces, and input/output signal interfaces, as well as combinations comprising at least one of the foregoing.

In accordance with an exemplary embodiment a dual-processor is used for the control algorithm in order to provide the computer recourses for executing the logic of algorithm of exemplary embodiments of the present inventions. In one exemplary embodiment the dual processor contemplates the use of the EyeQ chip plus another low cost processor (e.g., the Freescale Star 12) for a vehicle CAN interface and other control functions that do not require much memory or processing. The Freescale Star 12 is the next generation of the Motorola "HC12" family. This is a common microcontroller in the automotive industry and is compatible with, for example, Volvo Volcano CAN protocol. Of course, any other equivalent microprocessor capable of executing the algorithms of exemplary embodiments of the present invention is suitable and the aforementioned are merely provided as non-limiting examples.

Figure 12:
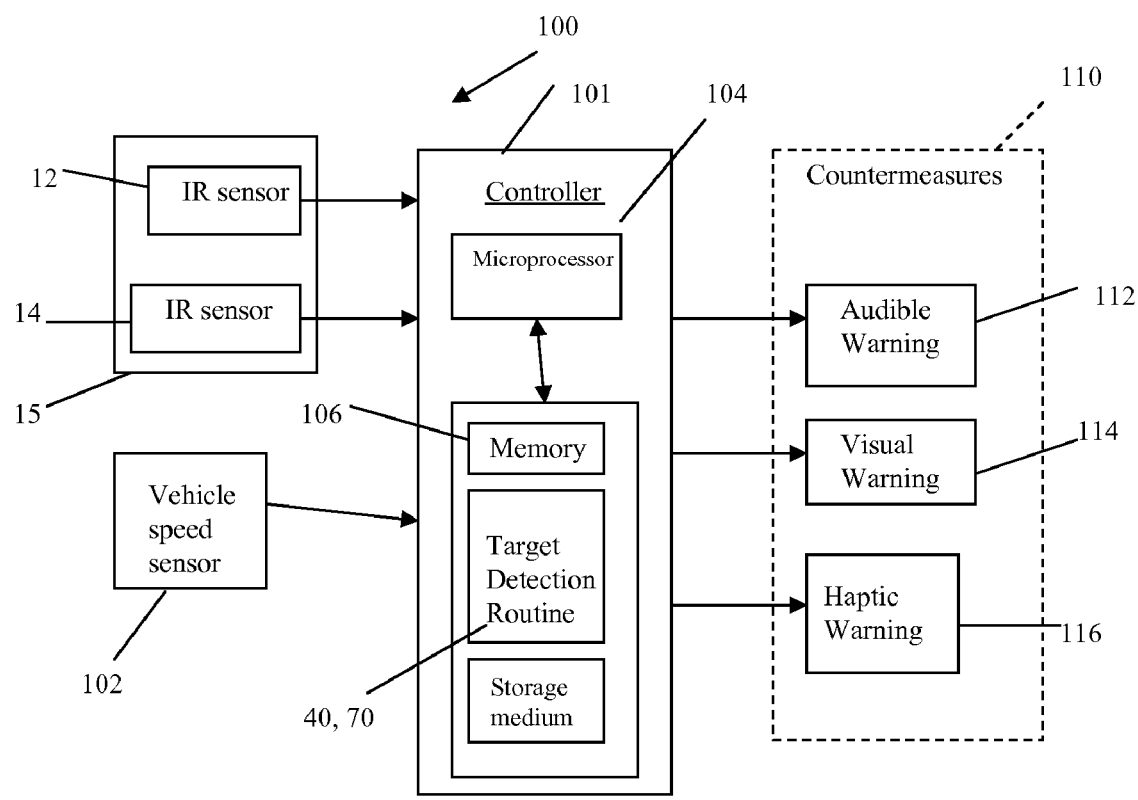
FIG. 12 is a schematic illustration of a detecting system in accordance with an exemplary embodiment of the present invention.

Referring to FIG. 12 a non-limiting example of an object detection system 100 constructed in accordance with an exemplary embodiment is generally shown including a controller or microcontroller 101 for processing output signals of the thermal detection sensors 12 and 14 and a vehicle speed sensor 102 and generating output(s) for any of a number of countermeasures 110. Although a single sensor or detecting device is shown it is understood that two or more sensing devices are contemplated to be used on either side of a vehicle to provide side detection.

The thermal detectors may include any of a number of known sensors for detecting thermal energy in a coverage zone. According to one embodiment, the thermal detectors includes an infrared (IR) sensor employing a thermopile sensor for sensing temperature in a coverage zone. One example of a commercially available thermal detector is the MLX90601 infrared thermometer module, which is commercially available from Melexis Microelectronic Integrated Systems. More specifically, the thermal detector may include Model No. MLX90601 EZA-CAA commercially available from Melexis Microelectronics Integrated Systems. Each of the sensors 12 and 14 may include any of a number of known thermal detecting sensors for detecting thermal energy applied thereto. According to one embodiment, the thermal detecting sensors may each include an infrared (IR) sensor employing a thermopile sensor for sensing temperature. One example of a commercially available thermal IR sensor is Model No. ZTP315, which is commercially available from General Electric. The aforementioned infrared thermometer module employs a thermopile sensor as the infrared sensing element for recording remote temperature measurements and includes signal conditioning, linearization, and ambient temperature compensation.

The controller may include a controller dedicated to target detection, or may include a shared controller, such as a body controller of the vehicle. The controller includes a microprocessor 104 and memory 106. The microprocessor may include a conventional microprocessor having the capability for processing algorithms and data as described herein. Memory 106 may include read-only memory (ROM), random access memory (RAM), flash memory, and other commercially available volatile and non-volatile memory devices. Stored within memory 106 and processed by microprocessor 104 is a target detection routine 40, 70 for detecting an object and initiating any countermeasures as described herein.

The countermeasures may include any of a number of known countermeasures for warning the driver of the vehicle or providing control functions such as collision avoidance. According to the embodiment shown, the countermeasures include an audible warning 1 12, a visual warning 114 and a haptic warning 116. The audible warning may include an audio alert sound or a message transmitted from an audio transmitter, such as an audio speaker. The visual warning may include any of a number of illuminated warnings such as indicator lights and messages, which may be presented to the driver via LEDs and displays. The haptic warning may include actively vibrating the driver's seat or other haptic warning functions.

In addition exemplary embodiments of the present invention are also contemplated for being combined with other non-moving side detection systems as well as a single stand alone feature (e.g., only configured for detecting moving objects being overtaken by the host vehicle (front detection) or moving object overtaking the host vehicle (rear detection) or only a system that has both the front and rear detection for moving objects).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A detecting device for a vehicle, the detecting device comprising:
   a first infrared detector configured to repeatedly measure a temperature of a first target area by receiving infrared radiation of the first target area, the first infrared detector being configured to provide a plurality of first signals each corresponding to a measured temperature of the first target area over a sampling period;
   a second infrared detector configured to repeatedly measure a temperature of a second target area by receiving infrared radiation of the second target area, the second infrared detector being configured to provide a plurality of second signals each corresponding to a measured temperature of the second target area over the sampling period, the second target area being different from the first target area; and a controller configured to receive and store the plurality of first signals and the plurality of second signals in a storage medium, wherein the controller repeatedly compares a plurality of correlation values to a predetermined tolerance range above a minimum threshold value to determine if an object is moving in either the first target area or the second target area and towards the detecting device, wherein the plurality of correlation values are determined by repeatedly comparing a plurality of time delayed signals of the second plurality of signals to a real time signal of the plurality of first signals;

wherein the controller is configured to ignore a constant difference between a first set of correlation values and a second set of correlation values if the vehicle speed is below a predetermined value by applying an offset value to the first set of correlation values.

2. The detecting device as in claim 1, wherein the plurality of time delayed signals comprises a first discrete signal, a second discrete signal and a third discrete signal, wherein the first discrete signal is selected by determining a distance "d1" between a central portion of the second target area and a central portion of the first target area and by dividing "d1" by a current velocity of the vehicle to determine a time delay for selecting the first discrete signal of the second plurality of signals, wherein the second discrete signal is selected by determining a distance "d2", which is less than d1 and by dividing "d2" by a current velocity of the vehicle to determine a time delay for selecting the second discrete signal of the second plurality of signals and wherein the third discrete signal is selected by determining a distance "d3", which is greater than d1 and by dividing "d3" by a current velocity of the vehicle to determine a time delay for selecting the third discrete signal of the second plurality of signals.

3. The detecting device as in claim 1, wherein the controller repeatedly compares three discrete signals of the second plurality of signals to a current one of the first plurality of signals to provide three discrete differences and wherein the controller repeatedly correlates a plurality of the three discrete differences to provide the plurality of correlation values.

4. The detecting device as in claim 3, wherein a first discrete signal is selected by determining a distance "d1" between a central portion of the second target area and a central portion of the first target area and by dividing "d1" by a current velocity of the vehicle to determine a time delay for selecting the first discrete signal of the second plurality of signals, wherein a second discrete signal is selected by determining a distance "d2" which is less than d1 and by dividing "d2" by a current velocity of the vehicle to determine a time delay for selecting the second discrete signal of the second plurality of signals and wherein a third discrete signal is selected by determining a distance "d3", which is greater than d1 and by dividing "d3" by a current velocity of the vehicle to determine a time delay for selecting the third discrete signal of the second plurality of signals.

5. The detecting device as in claim 1, wherein the first infrared detector and the second infrared detector are co-located in a single housing mounted to the vehicle and wherein the warning signal is provided if an object is moving towards the detecting device and a side portion of the vehicle.

6. The detecting device as in claim 5, wherein the first target area is proximate to a rear portion of the vehicle and the second target area is closer to a forward portion of the vehicle than the first target area and the correlation values are a mean square difference of a plurality of differences between the plurality of time delayed signals and the real time signal.

7. The detecting device as in claim 5, wherein the second target area is proximate to a rear portion of the vehicle and the first target area is closer to a forward portion of the vehicle than the rear target area.

8. The detecting device as in claim 1, wherein the first infrared detector and the second infrared detector are co-located in a single housing mounted to the vehicle and the first infrared detector and the second infrared detector are passive detectors positioned to receive radiation from reflective optics.

9. The detecting device as in claim 1, wherein the offset value is determined by summing and averaging the first set of correlation values to provide a first average signal and summing and averaging the second set of correlation values to provide a second average signal and determining the difference between the first average signal and the second average signal, wherein the difference is the offset value.

10. The detecting device as in claim 9, wherein the first infrared detector and the second infrared detector are co-located in a single housing mounted to the vehicle and wherein the first target area is proximate to a rear portion of the vehicle and the second target area is closer to a forward portion of the vehicle than the first target area and wherein the first infrared detector and the second infrared detector are passive detectors positioned to receive radiation from reflective optics.

11. A detecting device for a vehicle, the detecting device comprising:

a first infrared detector configured to repeatedly measure a temperature of a first target area by receiving infrared radiation of the first target area, the first infrared detector being configured to provide a plurality of first signals each corresponding to a measured temperature of the first target area over a sampling period;

a second infrared detector configured to repeatedly measure a temperature of a second target area by receiving infrared radiation of the second target area, the second infrared detector being configured to provide a plurality of second signals each corresponding to a measured temperature of the second target area over the sampling period, the second target area being different from the first target area;

a storage medium comprising a low speed buffer and a standard speed buffer, wherein a predetermined number of the plurality of first signals are first stored in the low speed buffer before a single one of the plurality of first signals is stored in the standard speed buffer and a predetermined number of the plurality of second signals are stored in the low speed buffer before a single one of the plurality of second signals is stored in the standard speed buffer; and a controller configured to receive and store the plurality of first signals and the plurality of second signals in the storage medium, wherein the controller repeatedly compares a plurality of correlation values to a predetermined tolerance range above a minimum threshold value to determine if an object is moving in either the first target area or the second target area and towards the detecting device, wherein the plurality of correlation values are determined by repeatedly comparing a plurality of time delayed signals of the second plurality of signals to a real time signal of the plurality of first signals, and the controller is configured to ignore a constant difference between a first set of correlation values and a second set of correlation values of either the low speed buffer or the standard speed buffer if the vehicle speed is below a predetermined value by applying an offset value to the first set of correlation values.

12. The detecting device as in claim 11, wherein the offset value is determined by summing and averaging the first set of correlation values to provide a first average signal and summing and averaging the second set of correlation values to provide a second average signal and determining the difference between the first average signal and the second average signal, wherein the difference is the offset value.

13. The detecting device as in claim 11, wherein the offset value is a low speed offset value determined by summing and averaging the first set of correlation values in the low speed buffer to provide a first average signal and summing and averaging the second set of correlation values in the low speed buffer to provide a second average signal and determining the difference between the first average signal and the second average signal, wherein the difference is the low speed offset value.

14. The detecting device as in claim 11, wherein the first infrared detector and the second infrared detector are co-located in a single housing mounted to the vehicle and wherein the first target area is proximate to a rear portion of the vehicle and the second target area is closer to a forward portion of the vehicle than the first target area and wherein the first infrared detector and the second infrared detector are passive detectors positioned to receive radiation from reflective optics.

15. The detecting device as in claim 11, wherein the offset value is a standard speed offset value determined by summing and averaging the first set of correlation values in the standard speed buffer to provide a first average signal and summing and averaging the second set of correlation values in the standard speed buffer to provide a second average signal and determining the difference between the first average signal and the second avenge signal, wherein the difference is the standard speed offset value.

16. A method for detecting whether an object is approaching a vehicle, the method comprising:
    sampling a first target area with a first infrared detector configured to repeatedly measure a temperature of the first target area by receiving infrared radiation of the first target area, the first infrared detector being configured to provide a plurality of first signals each corresponding to a measured temperature of the first target area over a sampling period;
    sampling a second target area with a second infrared detector configured to repeatedly measure a temperature of the second target area by receiving infrared radiation of the second target area, the second infrared detector being configured to provide a plurality of second signals each corresponding to a measured temperature of the second target area over the sampling period, the second target area being different from the first target area;
    storing the plurality of first signals and the plurality of second signals in a storage medium;
    determining a plurality of correlation values by repeatedly comparing a plurality of time delayed signals of the second plurality of signals to a real time signal of the plurality of first signals;
    comparing the plurality of correlation values to a predetermined tolerance range above a minimum threshold value to determine if an object is moving in either the first target area or the second target area and towards the detecting device; and
    providing a warning signal if a predetermined amount of the correlation values are outside the tolerance level range.

17. The method as in claim 16, wherein the first infrared detector and the second infrared detector are co-located in a single housing mounted to the vehicle.

18. The method as in claim 16, wherein the first target area is proximate to a rear portion of the vehicle and the second target area is closer to a forward portion of the vehicle than the first target area.

19. The method as in claim 16, wherein the controller is configured to ignore a constant difference between a first set of correlation values and a second set of correlation values if the vehicle speed is below a predetermined value by applying an offset value to the first set of correlation values.

20. The method as in claim 19, wherein the offset value is determined by summing and averaging the first set of correlation values to provide a first average signal and summing and averaging the second set of correlation values to provide a second average signal and determining the difference between the first average signal and the second average signal, wherein the difference is the offset value.

21. The method as in claim 20, wherein the first infrared detector and the second infrared detector are co-located in a single housing mounted to the vehicle and wherein the first target area is proximate to a rear portion of the vehicle and the second target area is closer to a forward portion of the vehicle than the first target area and wherein the first infrared detector and the second infrared detector are passive detectors positioned to receive radiation from reflective optics.

22. A method for detecting whether an object is approaching a vehicle, the method comprising:
    sampling a first target area with a first infrared detector configured to repeatedly measure a temperature of the first target area by receiving infrared radiation of the first target area, the first infrared detector being configured to provide a plurality of first signals each corresponding to a measured temperature of the first target area over a sampling period;
    sampling a second target area with a second infrared detector configured to repeatedly measure a temperature of the second target area by receiving infrared radiation of the second target area, the second infrared detector being configured to provide a plurality of second signals each corresponding to a measured temperature of the second target area over the sampling period, the second target area being different from the first target area;
    storing the plurality of first signals and the plurality of second signals in a storage medium, wherein the storage medium comprises a low speed buffer and a standard speed buffet, wherein a predetermined number of the plurality of first signals are first stored in the low speed buffer before a single one of the plurality of first signals is stored in the standard speed buffer and a predetermined number of the plurality of second signals are stored in the low speed buffer before a single one of the plurality of second signals is stored in the standard speed buffer and wherein the controller is configured to ignore a constant difference between a first set of correlation values and a second set of correlation values of either the low speed buffer or the standard speed buffer if the vehicle speed is below a predetermined value by applying an offset value to the first set of correlation values;
    determining a plurality of correlation values by repeatedly comparing a plurality of time delayed signals of the second plurality of signals to a real time signal of the plurality of first signals;

comparing the plurality of correlation values to a predetermined tolerance range above a minimum threshold value to determine if an object is moving in either the first target area or the second target area and towards the detecting device; and providing a warning signal if a predetermined amount of the correlation values are outside the tolerance level range.

23. The method as in claim 22, wherein the offset value is determined by summing and averaging the first set of correlation values to provide a first average signal and summing and averaging the second set of correlation values to provide a second average signal and determining the difference between the first average signal and the second average signal, wherein the difference is the offset value.

24. The method as in claim 22, wherein the offset value is a low speed offset value determined by summing and averaging the first set of correlation values in the low speed buffer to provide a first average signal and summing and averaging the second set of correlation values in the low speed buffer to provide a second average signal and determining the difference between the first average signal and the second average signal, wherein the difference is the low speed offset value.

25. The method as in claim 22, wherein the first infrared detector and the second infrared detector are co-located in a single housing mounted to the vehicle and wherein the first target area is proximate to a rear portion of the vehicle and the second target area is closer to a forward portion of the vehicle than the first target area and wherein the first infrared detector and the second infrared detector are passive detectors positioned to receive radiation from reflective optics and the correlation values are mean square differences of the differences between a first portion of the plurality of first signals and a second portion of the plurality of second signals.

26. The method as in claim 22, wherein the offset value is a standard speed offset value determined by summing and averaging the first set of correlation values in the standard speed buffer to provide a first average signal and summing and averaging the second set of correlation values in the standard speed buffer to provide a second average signal and determining the difference between the first average signal and the second average signal, wherein the difference is the standard speed offset value.

27. A detecting system for a vehicle, the detecting system, comprising:

an infrared detection device comprising: a first infrared detector configured to repeatedly measure a temperature of a first target area by receiving infrared radiation of the first target area, the first infrared detector being configured to provide a plurality of first signals each corresponding to a measured temperature of the first target area over a sampling period; and a second infrared detector configured to repeatedly measure a temperature of a second target area by receiving infrared radiation of the second target area, the second infrared detector being configured to provide a plurality of second signals each corresponding to a measured temperature of the second target area over the sampling period, the second target area being different from the first target area, wherein the first infrared detector and the second infrared detector are located in a single housing mounted to the vehicle and wherein the first target area is proximate to a rear portion of the vehicle and the second target area is closer to a forward portion of the vehicle than the first target area; and a controller comprising: a microprocessor and a storage medium, wherein the storage medium and the microprocessor are operably coupled to the first infrared detector and the second infrared detector and the storage medium is configured to receive and store the plurality of first signals and the plurality of second signals, wherein the microprocessor is configured to repeatedly compare a plurality of correlation values to a predetermined tolerance range above a minimum threshold value to determine if an object is moving in either the first target area or the second target area and towards the detecting device, wherein the plurality of correlation values are determined by the microprocessor executing a control algorithm that is configured to repeatedly compare a plurality of time delayed signals of the second plurality of signals to a real time signal of the plurality of first signals.

28. The detecting system as in claim 27, wherein the plurality of time delayed signals comprises a first discrete signal, a second discrete signal and a third discrete signal, wherein the first discrete signal is selected by determining a distance "d1" between a central portion of the second target area and a central portion of the first target area and by dividing "d1" by a current velocity of the vehicle to determine a time delay for selecting the first discrete signal of the second plurality of signals, wherein the second discrete signal is selected by determining a distance "d2", which is less than d1 and by dividing "d2" by a current velocity of the vehicle to determine a time delay for selecting the second discrete signal of the second plurality of signals and wherein the third discrete signal is selected by determining a distance "d3", which is greater than d1 and by dividing "d3" by a current velocity of the vehicle to determine a time delay for selecting the third discrete signal of the second plurality of signals.

29. The detecting system as in claim 27, wherein the controller is configured to ignore a constant difference between a first set of correlation values and a second set of correlation values if the vehicle speed is below a predetermined value by applying an offset value to the first set of correlation values, wherein the offset value is determined by summing and averaging the first set of correlation values to provide a first average signal and summing and averaging the second set of correlation values to provide a second average signal and determining the difference between the first avenge signal and the second average signal, wherein the difference is the offset value.

* * * * *